G. A. LYON.
AUTOMOBILE BUFFER ATTACHER.
APPLICATION FILED MAR. 20, 1920.
1,358,688.
Patented Nov. 9, 1920.
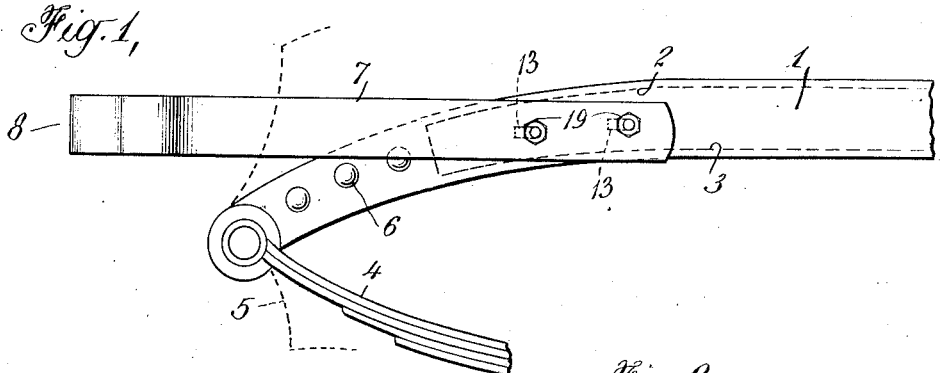
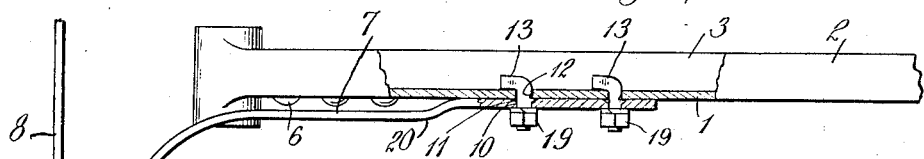
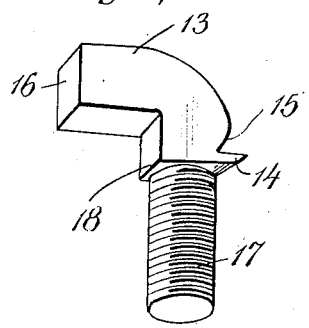
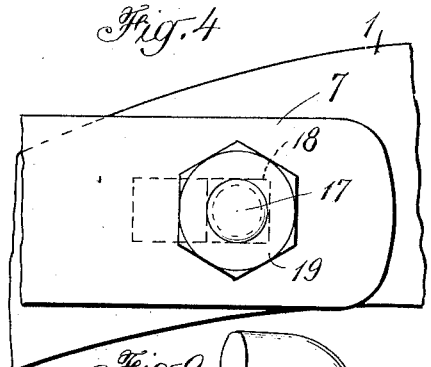
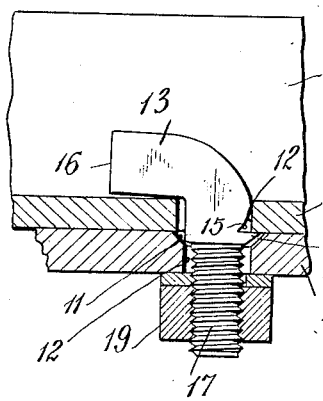
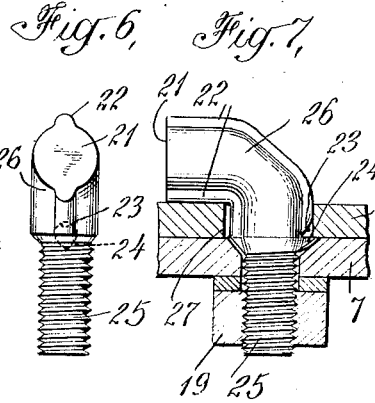
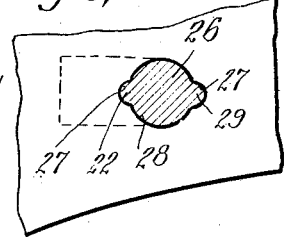
Inventor
George Albert Lyon
By his Attorney
Harry L. Meneau

UNITED STATES PATENT OFFICE.

GEORGE ALBERT LYON, OF PHILADELPHIA, PENNSYLVANIA.

AUTOMOBILE-BUFFER ATTACHER.

1,358,688.  Specification of Letters Patent.  Patented Nov. 9, 1920.

Application filed March 20, 1920. Serial No. 367,479.

*To all whom it may concern:*

Be it known that I, GEORGE ALBERT LYON, a citizen of the United States, and resident of Philadelphia, county of Philadelphia, and State of Pennsylvania, have made a certain new and useful Invention Relating to Automobile-Buffer Attachers, of which the following is a specification, taken in connection with the accompanying drawing.

This invention relates to angle bolt or alining buffer attachers by which automobile buffers or bumpers or other fittings or attachments having supporting members may be secured or clamped to the frame members of automobiles or other vehicles which for this purpose may advantageously be formed with one or more non-circular or polygonal frame apertures. When, for instance, the channel frame members of an automobile are formed with several square or other non-circular frame apertures at substantially a standard distance apart angle bolt attachers having shanks formed with a correspondingly non-circular or polygonal cross-section may be inserted into these apertures in the outside of the frame member and then turned to bring their bent over or holding ends or contact portions into laterally projecting position in which they may be retained by the alining action of the bolt stems which may pass through suitable slots or apertures in the supporting members of the automobile buffer or other attachment. The invention in this application which is a continuation in part of my co-pending application 276,899, filed February 14, 1919, relates especially to attachers of this general character in which the attacher stems are given in whole or in part a polygonal or non-circular cross-section or are formed with ribs or projections to have a rotary alining action in connection with a correspondingly shaped frame aperture which prevents undesirable rotary movement of the attacher as it is being tightened.

In the accompanying drawing showing in a somewhat diagrammatic way various illustrative embodiments of this invention, Figure 1 is an elevation showing one type of attacher or angle bolt in securing position in connection with an automobile buffer and frame member.

Fig. 2 is a top view partly in section of this arrangement.

Fig. 3 is a perspective view showing one of the attachers on a larger scale.

Fig. 4 is a side elevation thereof in its securing position.

Fig. 5 is a corresponding horizontal sectional view.

Fig. 6 is an end view of an attacher of different construction.

Fig. 7 is a horizontal sectional view of the same in holding position.

Fig. 8 is a sectional view through an attacher stem; and

Fig. 9 is a perspective view showing this modified form of attacher.

The automobile or other vehicle buffer or bumper may be of any desired form and construction and may have a resilient or other front portion 8 to which is secured as by the interposed loop the resilient or other supporting member 7 which may in some cases have an offset portion 20, so that these supporting members are carried around any rivets 6 or other projections on the automobile frame. The frame members of the automobile may be of any desired channel iron or angle iron type of construction and as indicated in Figs. 1 and 2 the frame may comprise the web 1 and the integral frame flanges 2, 3 to which the usual mud guards and splash pan 5 may be riveted or otherwise secured and the rivets 6 may secure to the end of these frame members or goose necks the connection for the spring 4 or other part of the automobile. These frame ends may be conveniently formed with polygonal or other non-circular frame apertures, such as 12, which may be punched or otherwise formed in the frame members and located at suitable distances from their ends and preferably at a substantially uniform distance apart, so that the attachment of automobile buffers and other fittings may be facilitated. The supporting members of the automobile buffer may be formed with correspondingly separated apertures, such as holes or adjusting slots where the angular position of the buffer or supporting member is to be adjusted.

Many desirable forms of angle bolt bumper attachers having polygonal or non-circular alining stems may be used in connection with such apertured automobile frame members even when the usual splash pan prevents ready access to the inner or rear face of the frame web and Figs. 1 to 5 show a type of angle bolt which is desirable for this purpose. This angle bolt has a lateral projecting or bent end 16 and an adjacent inserting bend 13, 14 which is preferably of such size and contour as to be readily inserted and turned within the frame aperture 12 so as to bring the threaded or other stem 17 of the angle bolt into the desired projecting position for engagement with the coöperating members. The angle bolt may be held or prevented from unduly projecting into the frame aperture as by one or more suitable retainers or projections, such as 14, which may be formed in any desired way on the stem of the bolt as by bending or forcing up this retainer during the bending or forging operation when a corresponding depression 15 may in some cases be simultaneously formed. By making the frame apertures about one-half inch square a considerable degree of added strength and stiffness of the bolt shank is secured as compared to a circular sectioned shank and in addition desirable rotary alining action is secured since when inserted in any desired position the subsequent rotation of the angle bolt about its stem or axis is effectively prevented. When, for example, one or more such attachers have been inserted in each frame member and turned around so as to bring their stems substantially into securing position they naturally remain in substantially such position so that the coöperating supporting members of the automobile buffer may be put in place and the apertures 10 therein brought into engagement with the projecting stems of the attachers without any great difficulty. This work can thus be done not only by the ordinary garage man but also by the automobile owner himself which is quite desirable in many cases.

The alining stems 15 of these attachers or angle bolts may be formed with any desired type of fastening device such as threaded portions 17 and these alining stems are of such size and shape as to properly coöperate with the apertures in supporting members of the automobile buffer or other attachments, the slots or apertures therein preferably fitting closely enough around these alining stems so as to prevent undesirable displacement when the parts are being tightened and if desired countersunk portions 11 may accommodate projecting retainers 14 as indicated in Fig. 5. Other coöperating alining means may also be used in many cases, such as washers or nuts 19 which may also with advantage fit tightly enough and have their inner faces trued up sufficiently to exert considerable alining action in connection with coöperating parts or faces against which they are secured when the nuts are tightened on the alining stems of the bolts. This tightening action brings the holding or contact portion of the angle bolt into tight holding engagement with the inner side of the frame web or member preferably closely adjacent the frame aperture. Security of attachment is thus insured as well as ample strength under collision conditions.

Figs. 6 and 7 show another form of attacher or angle bolt in which the stem has a non-circular cross-section so as to secure the rotary alining action referred to. This angle bolt may have one or more ribs or projecting portions 22 throughout its bent end or at least on the part of the stem coöperating with the recesses 27 in the frame apertures. If desired, two such ribs or projections may be used throughout at least this part of the bolt stem and the frame aperture may comprise several recesses such as shown in Fig. 8. Where as indicated in Figs. 6 and 7 these projecting ribs extend throughout the bent end of the angle bolt or attacher a considerable added stiffness is secured against bending which of course gives added strength to the attachment. These angle bolts may, if desired, be formed with a projecting retainer 24 to prevent the bolts being inserted into the frame member to an undesirable extent and a threaded portion 25 may be formed on the bolt stem to coöperate with the suitable aperture in the supporting member 7, of the buffer or other attachment and with the nut, such as 19, which may be used in connection therewith.

Fig. 9 shows another form of angle bolt or attacher which may have one or more projecting or pinched up portions, such as 22, which may be formed in one or both sides of the bolt stem so as to coöperate with recesses, such as 27, in the frame aperture. A retainer, such as 29, may project from the bolt stem so as to prevent undesirable insertion thereof into the frame member when the bolt end has been inserted and turned around so that the portion 26 of the stem engages the frame aperture. Thereafter the threaded end 31 of the attacher may be slipped through an alining or other hole in the supporting member and engaged by a suitable nut or other fastening device.

This invention has been described in connection with a number of illustrative forms, proportions, parts, units, articles, arrangements and methods of preparation and use, to the details of which disclosure the invention is not of course to be limited, since what is claimed as new and what is desired to be secured by Letters Patent is set forth in the appended claims:

1. In attaching devices adapted for use in attaching an automobile buffer to an automobile having flanged frame members provided with square frame apertures and having attached splash pan portions, a one-piece angle bolt attacher having a square sectioned stem portion adapted to be inserted through one of said apertures and prevent undesirable rotation of the attacher while it is securing the buffer to the coöperating frame member and having an angularly projecting holding portion to prevent withdrawal of the attacher from said aperture.

2. In attaching devices adapted for use in securing an automobile attachment to an automobile having flanged frame members provided with polygonal frame apertures and having attached splash pan portions, a one-piece bolt attacher having an alining stem adapted to be connected to a supporting member of the attachment and thereby held in substantial alinement with respect to the frame member, and having a laterally projecting holding portion adapted to be inserted through one of said apertures from the outside of the frame member and adapted to engage the frame member adjacent the said frame aperture and prevent withdrawal of the attacher, and a polygonal stem portion on said attacher to prevent undesirable rotation thereof.

3. In attaching devices adapted for use in securing an automobile attachment to an automobile having flanged frame members provided with polygonal frame apertures and having attached splash pan portions, a one-piece bolt attacher having a stem adapted to coöperate with a supporting member of the attachment and having a projecting holding portion adapted to engage the frame member and prevent withdrawal of the attacher and having a projecting alining portion adapted to coöperate with said polygonal frame apertures and prevent undesirable rotation of the attacher.

4. In attaching devices adapted for use in securing an automobile attachment to an automobile having flanged frame members provided with non-circular frame apertures and having attached splash pan portions, an attacher having a stem adapted to coöperate with a supporting member of the attachment and having a projecting holding portion adapted to engage the frame member and prevent withdrawal of the attacher and having a projecting alining portion adapted to coöperate with said non-circular frame apertures and prevent undesirable rotation of the attacher.

5. In attaching devices adapted for use in attaching an automobile buffer or other attachment to an automobile having a flanged frame member provided with a plurality of non-circular frame apertures, a plurality of bolt attachers adapted for insertion into said apertures from the outside of said frame members and each of said attachers having non-circular stem portions for preventing its undesirable rotation while the buffer coöperating secured parts are being secured in connection therewith to the coöperating frame member, and means for maintaining said attacher in alined holding position in connection with the coöperating secured parts.

6. In attaching devices adapted for use in attaching an automobile buffer to an automobile having flanged frame members provided with non-circular frame apertures, a plurality of one-piece attachers having threaded stems and laterally projecting holding portions adapted to be inserted into said apertures from the outside of said frame members and having a projecting portion adapted to coöperate with one of said apertures to prevent undesirable rotation during tightening of the parts and each of said attachers having means for preventing the insertion of said attachers into the coöperating frame apertures to an undesirable extent.

7. In automobile buffers, an automobile having flanged frame members provided with non-circular frame apertures and a splash pan coöperating with the inner sides of said frame members, a buffer having supporting members adapted to coöperate with said frame members and attachers having alining engagement with said supporting members and having holding ends adapted to be inserted through said frame apertures from the outer sides of said frame members and provided with externally operated means for tightening said attachers into holding engagement with the inner portions of said frame members to secure said supporting members thereto and projecting means on said attachers coöperating with said frame apertures to prevent the undesirable rotation of said attachers during the tightening thereof.

GEORGE ALBERT LYON.